(12) United States Patent  
Dohring et al.

(10) Patent No.: US 9,324,240 B2  
(45) Date of Patent: Apr. 26, 2016

(54) VERTICALLY INTEGRATED MOBILE EDUCATIONAL SYSTEM

(75) Inventors: Doug Dohring, Glendale, CA (US); David Hendry, La Crescenta, CA (US); Michael Bundlie, Sherman Oaks, CA (US)

(73) Assignee: AGE OF LEARNING, INC., Glendale, CA (US)

( * ) Notice: Subject to any disclaimer, the term of this patent is extended or adjusted under 35 U.S.C. 154(b) by 0 days.

(21) Appl. No.: 12/963,546

(22) Filed: Dec. 8, 2010

(65) Prior Publication Data

US 2012/0149001 A1    Jun. 14, 2012

(51) Int. Cl.
| | | |
|---|---|---|
| *G09B 5/00* | (2006.01) | |
| *G09B 5/06* | (2006.01) | |
| *G09B 7/06* | (2006.01) | |

(52) U.S. Cl.
CPC ... *G09B 5/06* (2013.01); *G09B 7/06* (2013.01)

(58) Field of Classification Search
CPC .............. G09B 5/00; G09B 5/06; G09B 7/00; G09B 7/06
USPC ................................................. 434/156–157
See application file for complete search history.

(56) References Cited

U.S. PATENT DOCUMENTS

| | | |
|---|---|---|
| 5,558,520 A | 9/1996 | Werzberger |
| 5,609,534 A | 3/1997 | Gebhardt et al. |
| 5,800,182 A | 9/1998 | Carson et al. |
| 5,904,485 A | 5/1999 | Siefert |
| 6,149,441 A | 11/2000 | Pellegrino et al. |
| 6,201,948 B1 | 3/2001 | Cook et al. |
| 6,353,447 B1 | 3/2002 | Truluck et al. |
| 6,358,053 B1 | 3/2002 | Rosenfield et al. |
| 6,364,666 B1 | 4/2002 | Jenkins et al. |
| 6,408,315 B1 | 6/2002 | McManus et al. |

(Continued)

FOREIGN PATENT DOCUMENTS

| | | |
|---|---|---|
| CN | 1647136 A | 7/2005 |
| CN | 101645190 A | 2/2010 |

(Continued)

OTHER PUBLICATIONS

PBS Kids website, http://pbskids.org/ screen capture, Accessed Oct. 13, 2010.

(Continued)

*Primary Examiner* — Robert J Utama
(74) *Attorney, Agent, or Firm* — Wilson Sonsini; Goodrich & Rosati

(57) ABSTRACT

A vertically integrated, mobile educational system for a child aged about 1 to about 12 years is presented comprising a mobile digital processing device that is optionally connected to a computer network and at least one mobile application provided to the mobile digital processing device. The one or more mobile applications include executable instructions that create a mobile interactive educational resource characterized by: providing a mobile extension of a web-based educational suite; integrating with the web-based educational suite according to an instructional plan designed to accomplish one or more specific educational objectives in a subject; and comprising one or more learning activities associated with a subject appropriate for the child. Additionally, the educational resource is substantially free of activities not teaching toward one or more educational objectives in a subject.

54 Claims, 5 Drawing Sheets

(56) References Cited

U.S. PATENT DOCUMENTS

| | | | |
|---|---|---|---|
| 6,456,230 | B2 | 9/2002 | Schwartz et al. |
| 6,563,514 | B1 | 5/2003 | Samar |
| 6,585,519 | B1 | 7/2003 | Jenkins et al. |
| 6,755,659 | B2 | 6/2004 | LoSasso et al. |
| 6,775,518 | B2 | 8/2004 | Norcott et al. |
| 6,827,578 | B2 | 12/2004 | Krebs et al. |
| 6,877,987 | B2 * | 4/2005 | Kulack ................ 434/118 |
| 6,928,260 | B2 | 8/2005 | Betz et al. |
| 6,985,913 | B2 * | 1/2006 | Murata ................ 434/317 |
| 6,988,138 | B1 | 1/2006 | Alcorn et al. |
| 7,014,467 | B2 | 3/2006 | Krebs et al. |
| 7,043,193 | B1 | 5/2006 | Vashi et al. |
| 7,055,823 | B2 | 6/2006 | Denkewicz, Jr. |
| 7,085,707 | B2 | 8/2006 | Milner |
| 7,153,140 | B2 | 12/2006 | Ivanir et al. |
| 7,210,938 | B2 | 5/2007 | Packard et al. |
| 7,286,793 | B1 | 10/2007 | Miele |
| 7,402,105 | B1 | 7/2008 | Hutter et al. |
| 7,631,254 | B2 | 12/2009 | Layard et al. |
| 7,677,967 | B2 | 3/2010 | Jessop et al. |
| 8,727,781 | B2 | 5/2014 | Dohring et al. |
| 8,731,454 | B2 | 5/2014 | Dohring et al. |
| 2001/0046658 | A1 * | 11/2001 | Wasowicz ............ 434/167 |
| 2001/0053513 | A1 * | 12/2001 | Corn et al. ........... 434/350 |
| 2002/0001791 | A1 * | 1/2002 | Wasowicz et al. ... 434/178 |
| 2002/0055089 | A1 | 5/2002 | Scheirer |
| 2002/0058236 | A1 | 5/2002 | Zhang |
| 2002/0076685 | A1 * | 6/2002 | Ueno ................... 434/350 |
| 2002/0164563 | A1 * | 11/2002 | Wasowicz et al. ... 434/178 |
| 2003/0036045 | A1 * | 2/2003 | Vivian ................. 434/350 |
| 2003/0124500 | A1 | 7/2003 | Frankenberry et al. |
| 2003/0152901 | A1 | 8/2003 | Altenhofen et al. |
| 2003/0207237 | A1 | 11/2003 | Glezerman |
| 2003/0232318 | A1 * | 12/2003 | Altenhofen et al. .. 434/362 |
| 2004/0076931 | A1 | 4/2004 | Rogan et al. |
| 2004/0126750 | A1 | 7/2004 | Theilmann et al. |
| 2005/0019741 | A1 | 1/2005 | Kim |
| 2005/0048449 | A1 | 3/2005 | Marmorstein et al. |
| 2005/0069843 | A1 | 3/2005 | McKinney et al. |
| 2005/0069849 | A1 * | 3/2005 | McKinney et al. ... 434/178 |
| 2005/0164154 | A1 | 7/2005 | Solomon |
| 2005/0277100 | A1 | 12/2005 | Bagley et al. |
| 2006/0105313 | A1 | 5/2006 | Mansfield et al. |
| 2006/0204942 | A1 * | 9/2006 | Kimball ............... 434/307 R |
| 2007/0020604 | A1 | 1/2007 | Chulet |
| 2007/0088712 | A1 | 4/2007 | Watson et al. |
| 2007/0112703 | A1 | 5/2007 | Gu et al. |
| 2007/0122788 | A1 | 5/2007 | Stevens, Jr. |
| 2007/0166690 | A1 | 7/2007 | Johnson |
| 2007/0172809 | A1 | 7/2007 | Gupta |
| 2007/0196807 | A1 | 8/2007 | Packard et al. |
| 2007/0238077 | A1 * | 10/2007 | Strachar ............... 434/178 |
| 2007/0298383 | A1 | 12/2007 | Jenkins et al. |
| 2008/0020367 | A1 | 1/2008 | Jessop et al. |
| 2008/0057482 | A1 | 3/2008 | Snyder et al. |
| 2008/0229182 | A1 * | 9/2008 | Hendricks et al. ... 715/205 |
| 2008/0254430 | A1 | 10/2008 | Woolf et al. |
| 2008/0254438 | A1 | 10/2008 | Woolf et al. |
| 2009/0011397 | A1 | 1/2009 | Writer |
| 2009/0017436 | A1 | 1/2009 | Sumrall et al. |
| 2009/0047650 | A1 | 2/2009 | Leuck et al. |
| 2009/0053681 | A1 | 2/2009 | Shen et al. |
| 2009/0094540 | A1 | 4/2009 | Gray et al. |
| 2009/0148824 | A1 | 6/2009 | Argott |
| 2009/0162822 | A1 * | 6/2009 | Strachan et al. ..... 434/309 |
| 2009/0167685 | A1 | 7/2009 | Wrubel et al. |
| 2009/0239202 | A1 * | 9/2009 | Stone .................. 434/178 |
| 2009/0291426 | A1 | 11/2009 | Polivka |
| 2009/0317778 | A1 | 12/2009 | Oberman |
| 2010/0075288 | A1 * | 3/2010 | Sareday ............... 434/322 |
| 2010/0081115 | A1 | 4/2010 | Harding et al. |
| 2010/0081116 | A1 | 4/2010 | Barasch et al. |
| 2010/0233667 | A1 | 9/2010 | Wilson et al. |
| 2011/0020781 | A1 | 1/2011 | Yang |
| 2011/0065082 | A1 | 3/2011 | Gal et al. |
| 2011/0207107 | A1 * | 8/2011 | Cancilliari et al. ... 434/309 |
| 2012/0122061 | A1 | 5/2012 | Dohring et al. |
| 2012/0122066 | A1 | 5/2012 | Dohring et al. |
| 2012/0122067 | A1 | 5/2012 | Dohring et al. |
| 2012/0231437 | A1 | 9/2012 | Fakhrai |
| 2012/0288846 | A1 | 11/2012 | Hull |
| 2013/0130217 | A1 | 5/2013 | Dohring et al. |
| 2014/0099624 | A1 | 4/2014 | Dohring et al. |
| 2014/0220537 | A1 | 8/2014 | Dohring et al. |
| 2014/0220543 | A1 | 8/2014 | Dohring et al. |
| 2014/0248597 | A1 | 9/2014 | Dohring et al. |

FOREIGN PATENT DOCUMENTS

| | | |
|---|---|---|
| JP | 2000511304 A | 8/2000 |
| JP | 2010-160556 | 7/2010 |
| KR | 10-2000-005844 | 9/2000 |
| KR | 10-2001-0008053 | 2/2001 |
| KR | 10-2001-0106820 | 12/2001 |
| KR | 10-2002-0034378 | 5/2002 |
| KR | 10-2002-0092556 | 12/2002 |
| KR | 10-2003-0055183 | 7/2003 |
| KR | 10-2003-0070878 | 9/2003 |
| KR | 20050104935 A | 11/2005 |
| KR | 10-2007-0113355 | 11/2007 |
| KR | 10-2008-0006063 | 1/2008 |
| KR | 10-2009-0061535 | 6/2009 |
| KR | 20100042636 A | 4/2010 |
| KR | 20100050302 A | 5/2010 |
| TW | 297526 | 2/1997 |
| TW | I269245 | 12/2006 |
| TW | I1269156 | 12/2006 |
| TW | I270023 | 1/2007 |
| TW | 200907875 | 2/2009 |
| TW | M378458 | 4/2010 |
| TW | M407458 | 7/2011 |
| WO | WO-0043972 A1 | 7/2000 |

OTHER PUBLICATIONS

Starfall website, http://more.starfall.com/ screen capture, Accessed Oct. 13, 2010.

Sesame St. website, http://www.sesamestreet.org/ screen capture, Accessed Oct. 13, 2010.

Disney Preschool website, http://preschooltime.go.com/ screen capture, Accessed Oct. 13, 2010.

Nick Jr. Boost website, http://www.nickjrboost.com/ screen capture, Accessed Oct. 13, 2010.

E-learning for Kids website, http://www.e-learningforkids.org/ screen capture, Accessed Oct. 13, 2010.

Fun School website, http://funschool.kaboose.com/ screen capture, Accessed Oct. 13, 2010.

Webkinz website, http://www.webkinz.com/ screen capture, Accessed Oct. 13, 2010.

Dreambox Learning website, http://www.dreambox.com/ screen capture, Accessed Oct. 13, 2010.

Time 4 Learning website, http://www.time4learning.com/ screen capture, Accessed Oct. 13, 2010.

IXL website, http://www.ixl.com/ screen capture, Accessed Oct. 13, 2010.

Learning Planet website, http://www.learningplanet.com/ screen capture, Accessed Oct. 13, 2010.

Children's Progress website, http://childrensprogress.com/ screen capture, Accessed Oct. 13, 2010.

Clever Island website, http://www.cleverisland.com/ screen capture, Accessed Oct. 13, 2010.

I Know That website, http://www.iknowthat.com/FT/index.html screen capture, Accessed Oct. 13, 2010.

Up to Ten website, http://uptoten.com/ screen capture, Accessed Oct. 13, 2010.

BrainPOP website, http://www.brainpop.com/ screen capture, Accessed Oct. 13, 2010.

Gamequarium website, http://www.gamequarium.com/ screen capture, Accessed Oct. 13, 2010.

Fish Smarty website, http://www.fishsmarty.com/ screen capture, Accessed Oct. 13, 2010.

(56) References Cited

OTHER PUBLICATIONS

Fun Brain website, http://www.funbrain.com/ screen capture, Accessed Oct. 13, 2010.
BrainPOP Mobile Application website, http://www.brainpop.com/apps/about/ screen capture, Accessed Nov. 30, 2010.
BrainPOP Featured Movie Mobile Application on Apple® iTunes® App Store, http://itunes.apple.com/us/app/brainpop-featured-movie/id364894352?mt=8 screen capture, Accessed Nov. 30, 2010.
Starfall Education Mobile Application website, http://more.starfall.com/info/apps/starfall-education.php screen capture, Accessed Nov. 30, 2010.
Starfall ABCs Mobile Application on Apple® iTunes® App Store, http://itunes.apple.com/us/app/starfall-abcs/id395623983?mt=8 screen capture, Accessed Nov. 30, 2010.
Berenstain Bears and the Golden Rule Mobile Application on Apple® iTunes® App Store, http://itunes.apple.com/us/app/the-berenstain-bears-golden/id392186848?mt=8 screen capture, Accessed Dec. 2, 2010.
Zoo You Later—Monkey Business Mobile Application on Apple® iTunes® App Store, http://itunes.apple.com/us/app/zoo-you-later-monkey-business/id373017053?mt=8 screen capture, Accessed Dec. 2, 2010.
Dr. Seuss's ABC Mobile Application on Apple® iTunes® App Store, http://itunes.apple.com/us/app/dr.-seusss-abc/id354855128?mt=8 screen capture, Accessed Dec. 2, 2010.
The Velveteen Rabbit, http://itunes.apple.com/us/app/the-velveteen-rabbit/id395279598?mt=8 screen capture, Accessed Dec. 2, 2010.
Mrs. P's Reader Challenge Mobile Application on Apple® iTunes® App Store, http://itunes.apple.com/us/app/mrs-p/id398450178?mt=8 screen capture, Accessed Dec. 2, 2010.
Miss Spider's Tea Party Mobile Application on Apple® iTunes® App Store, http://itunes.apple.com/us/app/miss-spiders-tea-party-for/id365173247?mt=8 screen capture, Accessed Dec. 2, 2010.
Toy Story Read Along Mobile Application on Apple® iTunes® App Store, http://itunes.apple.com/us/app/toy-story-read-along/id364376920?mt=8 screen capture, Accessed Dec. 2, 2010.
Jack and The Beanstalk Kid's Story Book Mobile Application on Apple® iTunes® App Store, http://itunes.apple.com/us/app/jack-and-the-beanstalk-kids/id387612649?mt=8 screen capture, Accessed Dec. 2, 2010.
One Rainy Day Mobile Application on Apple® iTunes® App Store, http://itunes.apple.com/us/app/one-rainy-day-a-read-along/id396522639?mt=8 screen capture, Accessed Dec. 2, 2010.
Aesop's Fables Audio book Mobile Application on Apple® iTunes® App Store, http://itunes.apple.com/us/app/aesops-fables-for-children/id371850401?mt=8 screen capture, Accessed Dec. 2, 2010.
Sophia Wants to Be . . . A Painter Mobile Application on Apple® iTunes® App Store, http://itunes.apple.com/us/app/sophia-wants-to-be-...-a-painter/id325197608?mt=8 screen capture, Accessed Dec. 2, 2010.
Little Red Riding Hood Mobile Application on Apple® iTunes® App Store, http://itunes.apple.com/us/app/little-red-riding-hood-kids/id329098511?mt=8# screen capture, Accessed Dec. 2, 2010.
The Emperor's New Clothes Mobile Application on Apple® iTune® App Store, http://itunes.apple.com/us/app/id389589624?mt=8 screen capture, Accessed Dec. 2, 2010.
PCT/US2011/063602 International Search Report with Written Opinion mailed Jun. 21, 2012.
PCT/US2011/060850 International Search Report dated May 14, 2012.
PCT/US2011/060853 International Search Report dated May 17, 2012.
PCT/US2011/060848 International Search Report dated Jun. 14, 2012.
U.S. Appl. No. 12/946,538 Non-Final Office Action issued Oct. 15, 2012.
U.S. Appl. No. 12/946,570 Non-Final Office Action dated Oct. 24, 2012.
U.S. Appl. No. 12/963,546 Non-Final Office Action dated Aug. 31, 2012.
TW100141696 Office Action dated Feb. 5, 2015.
U.S. Appl. No. 12/946,538 Office Action dated Dec. 18, 2014.
U.S. Appl. No. 12/946,627 Office Action dated Dec. 15, 2014.
U.S. Appl. No. 13/828,671 Office Action dated Jan. 28, 2015.
PCT/US2012/065940 International Preliminary Report on Patentability dated Jun. 5, 2014.
PCT/US2013/041001 International Search Report and Written Opinion dated Aug. 27, 2013.
PCT/US2013/041001 International Preliminary Report on Patentability dated Nov. 18, 2014.
TW100141697 Office Action dated May 29, 2014.
TW100141696 Office Action dated Jun. 3, 2014.
TW100144938 Office Action dated Jun. 5, 2014.
U.S. Appl. No. 12/946,627 Office Action dated Apr. 10, 2013.
U.S. Appl. No. 13/827,566 Office Action dated Aug. 14, 2014.
U.S. Appl. No. 14/247,040 Office Action dated Oct. 9, 2014.
Zoodles website, http://www.zoodles.com/home/marketing screen capture, Accessed Oct. 13, 2010.
U.S. Appl. No. 13/827,566 Office Action dated Apr. 20, 2015.
U.S. Appl. No. 12/946,538 Office Action dated Jul. 2, 2015.
U.S. Appl. No. 13/827,566 Office Action dated Aug. 26, 2015.
U.S. Appl. No. 13/828,671 Office Action dated Aug. 17, 2015.
U.S. Appl. No. 14/247,022 Office Action dated Jul. 23, 2015.
U.S. Appl. No. 14/247,040 Office Action dated Aug. 13, 2015.
U.S. Appl. No. 12/946,570 Non-Final Office Action dated Mar. 11, 2014.
U.S. Appl. No. 13/301,641 Non-Final Office Action dated Mar. 11, 2014.
PCT/US2011/063602 International Report on Patentability dated Jun. 20, 2013.
PCT/US2011/060848 International Report on Patentability dated May 30, 2013.
U.S. Appl. No. 12/946,538 Final Office Action issued May 8, 2013.
PCT/US2011/060850 International Report on Patentability dated May 30, 2013.
U.S. Appl. No. 12/946,570 Final Office Action dated Apr. 11, 2013.
PCT/US2011/060853 International Report on Patentability dated May 30, 2013.
U.S. Appl. No. 12/946,627 Non-Final Office Action dated Apr. 10, 2013.
PCT/US2012/065940 International Search Report dated May 24, 2013.
U.S. Appl. No. 12/946,570 Final Office Action dated Jul. 31, 2013.
U.S. Appl. No. 12/946,627 Final Office Action dated Oct. 21, 2013.
U.S. Appl. No. 13/301,641 Final Office Action dated Oct. 30, 2013.
U.S. Appl. No. 13/301,641 Non-Final Office Action dated Jul. 18, 2013.

* cited by examiner

VERTICALLY INTEGRATED MOBILE EDUCATIONAL SYSTEM

BACKGROUND OF THE INVENTION

Higher levels of education offer benefits, both intangible and economic, for students and the societies in which they live. Personal benefits can include a feeling of fulfillment, social and economic mobility, and increased quality of life. According to the U.S. Census Bureau, over an adult's working life, high school graduates earn an average of $1.2 million; associate's degree holders earn about $1.6 million; and bachelor's degree holders earn about $2.1 million. On a larger scale, countries with high enrollment and graduation rates have experienced faster economic growth than countries without.

The future of education will be shaped by the integration of mobile computing devices into learning environments. Children's access to mobile computing devices is growing rapidly as is children's familiarity with such devices and predilection for using them. One indicator of the trend toward mobile computing is found in the mobile smartphone arena. The International Telecommunication Union estimates that there are currently 5.3 billion mobile subscriptions worldwide. Moreover, The Nielsen Company reports that multipurpose smartphones that allow users to access the World Wide Web as well as execute mobile applications constitute 25% of the U.S. mobile phone market. Within a year, Nielsen predicts use of such smartphones to overtake other mobile phones.

SUMMARY OF THE INVENTION

Studies acknowledged by the Centers for Disease Control and Prevention (CDC) confirm the nearly universal view that the early years of a child's life are crucial for cognitive, social, and emotional development. Early education, from age 0 to 5 years, is especially critical. During this period, children develop the foundation for their enduring language, motor, and analytical skills. It is important to note that during this critical period and beyond, not all children learn in the same way. Howard Gardner, developmental psychologist and Professor of Cognition and Education at Harvard University, elucidated eight separately identifiable types of intelligence: linguistic, logic-mathematical, musical, spatial, bodily kinesthetic, naturalist, interpersonal, and intrapersonal. An effective educational system should offer differentiated curriculum to address the fact that every student arrives at a learning experience with different prior knowledge, different interests, different learning styles, and different areas of challenge. Moreover, effective education should provide content in forms that match all of the ways in which human beings learn so as to accelerate learning and develop the student's ability to interact creatively with knowledge.

Technology offers educators new opportunities to create powerful learning tools and new ways to interact with learners. One example is interactive learning activities that employ mobile devices. Learning activities extended to mobile devices take advantage of the fact that children and other students commonly use mobile devices to access information, have the ability to use mobile devices, and have a predilection for doing so. Moreover, mobile learning takes advantage of the increase in interactivity provided by the touchscreens that many mobile devices employ.

Despite the potential to use mobile applications to extend learning activities to mobile devices, current online educational systems offer little opportunity for mobile native learning. Accordingly, we have identified a long-felt and unmet need for mobile solutions that extend learning activities to mobile environments in way that is integrated with web-based educational suites of activities.

Disclosed herein are mobile educational systems, methods of education, and media encoded with computer programs. In some embodiments, a vertically integrated, mobile educational system is for a child aged about 1 to about 12 years and comprises a mobile digital processing device that is optionally connected to a computer network and at least one mobile application provided to the mobile digital processing device. The mobile digital processing device comprises an operating system configured to execute mobile applications, a central processing unit (CPU), a memory device, a display, an input device, and a sound output device. In further embodiments, the mobile application or applications include executable instructions that create a mobile interactive educational resource characterized by: providing a mobile extension of a web-based educational suite; integrating with the web-based educational suite according to an instructional plan designed to accomplish one or more specific educational objectives in a subject; and comprising one or more learning activities associated with a subject appropriate for the child. Additionally, in some embodiments, the educational resource is substantially free of activities not teaching toward one or more educational objectives in a subject. In some embodiments, the mobile educational system is for children aged about 2 years to about 10 years. In other embodiments, the mobile educational system is for children aged about 2 years to about 6 years.

One aspect of the mobile educational systems disclosed herein is a mobile digital processing device that is optionally connected to a computer network. Any portable computing device with a CPU, a memory device, a display, an input device, a sound output device, and the capability to execute a mobile application is suitable for use in the system. In some embodiments, the mobile educational systems are intranet-based such that the mobile digital processing device is optionally connected to an intranet. In further embodiments, one or more mobile applications are provided to the mobile digital processing device via an intranet. In some embodiments, the mobile educational systems are Internet-based. In further embodiments, the mobile educational systems are World Wide Web-based. In still further embodiments, the mobile educational systems are cloud computing-based. In other embodiments, the mobile educational systems are based on data storage devices including, by way of non-limiting examples, CD-ROMs, DVDs, flash memory devices, magnetic disk drives, and optical disk drives.

Another aspect of the mobile educational systems disclosed herein is at least one mobile application provided to the mobile digital processing device and creating a mobile interactive educational resource. In some embodiments, the mobile application is adapted to optionally function as a standalone application. In some embodiments, the mobile application is adapted to function as a unit within a set or sequence of mobile applications. In further embodiments, the set or sequence of mobile applications is predetermined and authored by an instructional designer or a mentor to the child. In other embodiments, the set or sequence of mobile applications is dynamically determined and assembled by one or more mobile applications by detecting other applications on the mobile digital processing device based on one or more criteria. In further embodiments, a criterion includes similarity of content, similarity of theme, similarity of one or more learning objectives, or similarity of one or more elements of a published educational standard addressed. In still further embodiments, one or more mobile applications within a set or sequence of mobile applications executes other mobile applications within the set or sequence or recommends other mobile applications within the set or sequence to the child or a mentor to the child. In some embodiments, one or more mobile applications within a set or sequence of mobile applications adapts in content or functionality based on membership in a set or sequence, position in a sequence, or characteristics of other members of the set or sequence.

In some embodiments, the mobile application further comprises a software module for providing context-specific suggestions of things to do or talk about with the child that support one or more educational objectives, wherein the software module is adapted for use by a mentor. In some embodiments, the mobile application further comprises a software module for providing comparison of performance with other users of the system. In some embodiments, the mobile application further comprises a software module for providing the child the ability to customize said mobile application. In some embodiments, the mobile application further comprises a glossary. In further embodiments, the glossary comprises one or more entries, wherein said entries comprise a word, a definition of the word, and an example of the word's usage. In some of these embodiments, the entries further comprise audio of the word and definition read. In some embodiments, the entries further comprise an image, video, or animation associated with the word. In some embodiments, the glossary is contextual and displays only words used in the current learning activity or the current portion of the current learning activity. In further embodiments, the audio of the word read has the correct inflection for the context.

Another aspect of the mobile educational systems disclosed herein is a mobile interactive educational resource. In some embodiments, the mobile interactive educational resource provides a mobile extension of a web-based educational suite. In some embodiments, the web-based educational suite comprises at least three subjects appropriate for the child and a plurality of learning activities associated with each subject. In some embodiments, the mobile interactive educational resource integrates with the web-based educational suite according to an instructional plan designed to accomplish one or more specific educational objectives in a subject. In some embodiments, an instructional designer authors the instructional plan. In some embodiments, the mobile interactive educational resource comprises one or more learning activities associated with a subject appropriate for the child. In further embodiments, the mobile interactive educational resource is substantially free of activities not teaching toward one or more educational objectives in a subject.

Another aspect of the mobile educational systems disclosed herein is a mobile interactive educational resource comprising one or more learning activities associated with a subject appropriate for the child. In some embodiments, the educational resource is substantially free of learning activities not teaching toward one or more educational objectives in a subject. In some embodiments, the learning activities are selected from art, articles, books, brainstorms, collaborations, demonstrations, e-books, examinations, games, group activities, journals, laboratory experiments, lectures, multiplayer games, music, problem sets, puzzles, quizzes, reading assignments, role-plays, simulations, songs, videos, and worksheets. In some embodiments, completion of a learning activity in said mobile application is the equivalent of completing a substantially similar activity in said web-based educational suite. In further embodiments, completion of a learning activity in said mobile application is the equivalent of completing a substantially similar activity with regard to progressing to subsequent activities in a predetermined sequence or with regard to tracking and reporting progress or performance of the child. In some embodiments, one or more learning activities are available in a language other than English.

In some embodiments, the mobile application comprises one or more learning activities that are interactive virtual books comprising text and/or images, animated pages, optionally voice audio, and optionally music. In further embodiments, the images comprise animation or video. In some embodiments, the text is presented in animated pop-up bubbles, the images are arranged substantially in a graphic novel format, and the voice audio is that of one or more character voices. In some embodiments, the interactive virtual books further comprise one or more software modules that extend the features and functionality of the books. In some embodiments, the interactive virtual books further comprise a software module for providing highlighting of text corresponding to the audio of the text read. In some embodiments, books further comprise a software module for providing audio of each word read, where the audio is accessed by interacting with each word. In further embodiments, the audio of the word read has the correct inflection for the context. In some embodiments, books further comprise software modules for recording voice audio of a child or a mentor reading the book and for sharing books personalized by recorded voice audio.

In some embodiments, the interactive virtual books include two or more use modes that allow the child to have the book read to them start to finish, have the book read to them with pauses between pages, or read the book themselves. In still further embodiments, the child or a mentor optionally switches between reading modes. In some embodiments, the interactive virtual books further comprise a quiz, puzzle, game, song, or art activity. In some embodiments, the interactive virtual books further comprise a full screen mode.

In some embodiments, the mobile application comprises one or more learning activities that are interactive explorations comprising animated visual content depicting an environment suitable for the child's learning, sound effects, factual information presented in pop-up bubbles, and one or more quizzes. In further embodiments, the factual information presented in pop-up bubbles is activated by interacting with said mobile application. In still further embodiments, the animated visual content is video. In some embodiments, the animated visual content depicts an environment such as a bedroom, backyard, city, town, playground, school bus, zoo, farm, park, beach, mountain, desert, ocean, lake, jungle, tunnel, cave, undersea environment, arctic or Antarctic environment, extraterrestrial environment, garden, campus, scientific laboratory, art studio, music conservatory, computer laboratory, observatory, planetarium, movie, play, puppet show, sporting event, amusement park, carnival, theme park, arcade, pet store, shopping mall, market, kitchen, garage, machine shop, wood working shop, metal working shop, or medical facility.

The term "age" as used herein, refers to the length of time that a person has lived and also serves as an expression of a person's maturational progress in terms of social functioning, psychological functioning, mental functioning, cognitive functioning, and motor skills.

The term "child" as used herein, refers to a person between the stages of birth and puberty and also refers to a person with social, psychological, mental, or cognitive functioning comparable to such a person.

The term "mentor" as used herein, refers to a person who has an interest in, or responsibility for, facilitating or furthering the educational development of a child, and includes, by way of non-limiting examples; a parent, step-parent, adoptive parent, foster parent, grandparent, guardian, relative, friend, guide, instructor, teacher, or professor, of a child.

The term "instructional designer" as used herein, refers to any person who designs and/or evaluates learning activities, and grouped sequences of activities, that are elements of an educational system.

The term "instructional plan" as used herein, refers to a plan, conceived by an instructional designer or a mentor to a learner, designed to accomplish one or more specific educational objectives through the mutual reinforcement of individual activities.

The term "lesson" as used herein, refers to one or more learning activities that teach toward a specific educational objective or a specific element of a published educational standard.

The term "learning unit" as used herein, refers to one or more lessons that teach toward a general educational objective or a general element of a published educational standard.

The term "level of study" as used herein, refers to one or more learning units that teach toward a plurality of general educational objectives or an overarching element of a published educational standard.

The term "interactive virtual book" as used herein, refers to a compiled software program, comprising original programming code, executable on any number of mobile digital processing devices supporting any mobile operating system that allows third party applications. Interactive virtual books, as defined herein, comprise learning activities that take many forms and resemble a book format to some extent.

The term "e-book" as used herein, refers to a digital book formatted according to any one of the predefined and standardized file formats for e-books. E-books, as defined herein, are viewable on a plurality of mobile digital processing devices, but are particularly well-suited for viewing on an e-book reader or a device with e-book reader functionality.

The term "standalone application" as used herein, refers to computer software that does not necessarily require connection to a computer network to function.

DETAILED DESCRIPTION OF THE INVENTION

Figure 1:
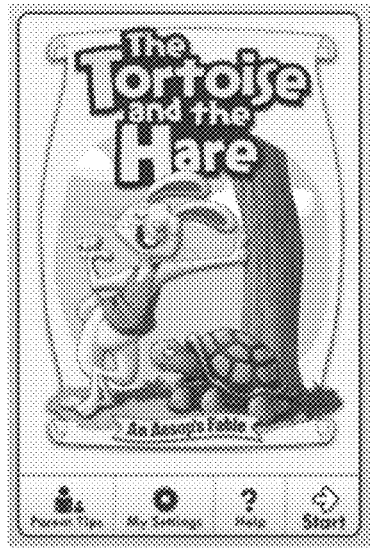
FIG. 1 shows a non-limiting example of a mobile application including executable instructions that create a mobile interactive educational resource comprising a learning activity; in this case, an interactive virtual book.

Existing educational systems do not offer sufficient options for mobile learning and therefore miss opportunities to differentiate curriculum and leverage the way that children access information and learn. The mobile options available do not employ mobile applications to extend a web-based educational suite in a way that is integrated with the suite according to an instructional plan. Thus, a primary objective of the vertically integrated, mobile educational system disclosed herein is to extend educational content to forms that match all of the ways in which children learn, so as to accelerate learning and to develop children's ability to interact creatively with knowledge. Another primary objective of the educational system disclosed herein is to provide learning activities through the types of devices that children and other students are commonly using to access information and to take advantage of the increase in interactivity provided by the touchscreens that many mobile devices employ. Another objective is to differentiate curriculum to address the fact that every child arrives at a learning experience with different prior knowledge, different interests, different learning styles, and different areas of challenge.

Advantages of the systems described herein include, but are not limited to, enhanced engagement of children through providing integrated mobile options for participating in learning activities, leveraging children's ability to use mobile devices and their predilection for doing so, and increased opportunity to address kinesthetic learning styles though encouraging use of handheld and touchscreen devices.

Vertically Integrated, Mobile Educational System

Disclosed herein is a vertically integrated, mobile educational system for a child aged about 1 to about 12 years comprising a mobile digital processing device that is optionally connected to a computer network and at least one mobile application provided to the mobile digital processing device. The mobile digital processing device comprises an operating system configured to execute mobile applications, a central processing unit, a memory device, a display, an input device, and a sound output device. The one or more mobile applications include executable instructions that create a mobile interactive educational resource characterized by: providing a mobile extension of a web-based educational suite; integrating with the web-based educational suite according to an instructional plan designed to accomplish one or more specific educational objectives in a subject; and comprising one or more learning activities associated with a subject appropriate for the child. Additionally, the educational resource is substantially free of activities not teaching toward one or more educational objectives in a subject.

Embodiments of the mobile educational environment disclosed herein are designed for children aged about 1 to about 12. Moreover, the subjects and learning activities are selected to be appropriate for children of that age range. However, it will be understood by those of skill in the art that children learn at different paces and reach developmental milestones at different ages. Therefore, the ages 1 and 12 are approximate and used herein to mark the approximate age extremes of the intended audience of children. In other embodiments, the mobile educational system is for children aged about 2 years to about 10 years. In other embodiments, the mobile educational system is for children aged about 2 years to about 6 years.

Mobile Digital Processing Device

The vertically integrated, mobile educational system disclosed herein includes a mobile digital processing device. The mobile digital processing device includes one or more hardware central processing units (CPU) that carry out the device's functions. The digital processing device further comprises an operating system configured to execute mobile applications, a memory device, a display, a sound output device, and an input device. The mobile digital processing device is optionally connected to a computer network. In some embodiments, the processing device is connected to the Internet such that it accesses the World Wide Web. In other embodiments, the processing device is connected to an intranet. In other embodiments, the processing device is connected to a data storage device.

The mobile digital processing device includes an operating system configured to execute mobile applications. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Nokia® Maemo®, Apple® iOS®, Research In Motion® BlackBerry OS®, Google® Android®, Microsoft® Windows Phone® OS, Microsoft® Windows Mobile® OS, Linux®, MeeGo™, Palm® WebOS®, and Samsung® bada.

The mobile digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

The mobile digital processing device includes a display to send visual information to the child. In some embodiments, the display is a liquid crystal display (LCD). In further embodiments, the display is a thin film transistor liquid crystal display (TFT-LCD). In some embodiments, the display is an organic light emitting diode (OLED) display. In some embodiments, the display is a plasma display. In other embodiments, the display is a video projector. In still further embodiments, the display is a combination of devices such as those disclosed herein. In further embodiments, the display is a touchscreen or multi-touchscreen and also serves as an input device.

The mobile digital processing device includes a sound output device to send auditory information to the child. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

The digital processing device includes an input device to receive information from the child. In some embodiments, the input device is a keyboard or keypad. In some embodiments, the input device is a pointing device including, by way of non-limiting examples, a mouse, trackball, trackpad, touchpad, joystick, game controller, pen, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In accordance with the description herein, suitable mobile digital processing devices include, by way of non-limiting examples, laptop computers, notebook computers, tablet computers, netbook computers, smartbook computers, sub-notebook computers, ultra-mobile PCs, handheld computers, personal digital assistants, Internet appliances, smartphones, music players, e-book readers, and portable video game systems. Those of skill in the art will recognize that many mobile phones are suitable for use in the system described herein. Suitable tablet computers include those with booklet, slate, and convertible configurations, known to those of skill in the art. Suitable e-book readers include, by way of non-limiting examples, Amazon® Kindle™, Barnes & Noble Nook™, Sony® Reader™, iRex iLiad, the Jinke Hanlin eReader, Bookeen CyBook, Endless Ideas BeBook, and the Kobo™ eReader. Suitable portable video game systems include, by way of non-limiting examples, Nintendo DS™ and Sony® PSP™.

Computer Network

The vertically integrated, mobile educational system disclosed herein includes a mobile digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the mobile application is provided to the mobile digital processing device via the Web. In still further embodiments, the Internet provides access to the World Wide Web and the mobile application is provided to the mobile digital processing device via cloud computing. In other embodiments, the computer network comprises data storage devices including, by way of non-limiting examples, CD-ROMs, DVDs, flash memory devices, magnetic disk drives, and optical disk drives. In further embodiments, the mobile application is provided to the mobile digital processing device via a data storage device.

Mobile Application

The vertically integrated, mobile educational system disclosed herein includes at least one mobile application, provided to the mobile digital processing device. In some embodiments, the mobile application is provided to the mobile digital processing device at the time it is manufactured. In other embodiments, the mobile application is provided to the mobile digital processing device via the computer network described herein. The mobile application or applications include executable instructions that create a mobile interactive educational resource.

In view of the disclosure provided herein, the mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java, Javascript, Pascal, Object Pascal, Python, Ruby, VB.NET, WML, and XHTML/HTML with or without CSS, or combinations thereof.

Those of skill in the art will also recognize that mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Figure 2:
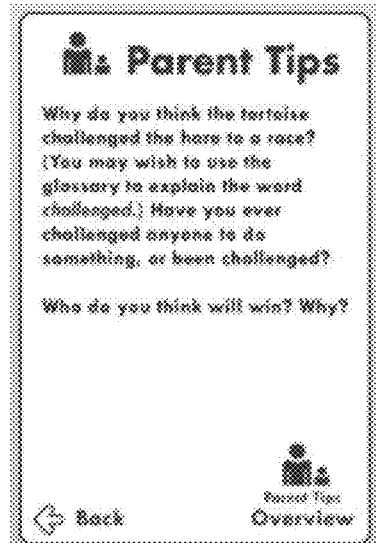
FIG. 2 shows a non-limiting example of context-specific suggestions of things to do or talk about with the child that support one or more educational objectives; in this case, a parent tip accessed from an interactive virtual book.

Referring to FIG. 2, in some embodiments, the mobile application further comprises a software module for providing context-specific suggestions of things to do or talk about with the child that support one or more educational objectives, wherein the software module is adapted for use by a mentor. In further embodiments, the context-specific suggestions of things to do or talk about with the child are authored by an instructional designer. In one embodiment, the suggestion focuses on discovering child's understanding of vocabulary used in the current learning activity. In another embodiment, the suggestion focuses on helping the child draw parallels between their experiences and the current learning activity. In another embodiment, the suggestion focuses on helping the child relate the content of the current learning activity to their own experience or their own environment. In yet another embodiment, the suggestion focuses on helping the child understand the theme or educational objectives of the current learning activity.

In some embodiments, the mobile application further comprises a software module for providing comparison of performance with other users of the system. In further embodiments, the comparison is a display of scores of other users on specific learning activities, sets of activities, or sequences of activities. In other embodiments, software module compares the number of times one or more activities are completed or the time spent on one or more activities.

In some embodiments, the mobile application further comprises a software module for providing the child or a mentor the ability to customize the mobile application. In further embodiments, the child customizes the application by adding their name to the graphic user interface (GUI). In other embodiments, the child customizes the application by drawing or coloring aspects of the learning activities. In still other embodiments, the child customizes the application by recording voice audio or audio of music that they child makes by using the application.

Figure 3:
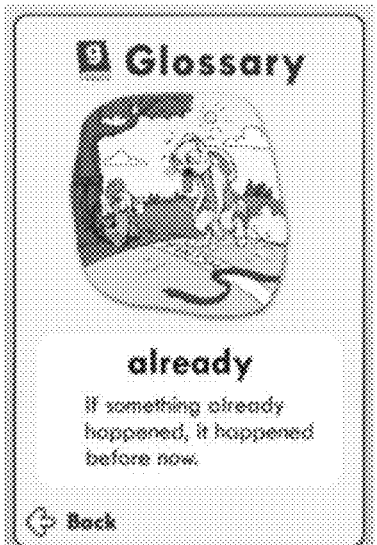
FIG. 3 shows a non-limiting example of a glossary; in this case, an entry in a contextual glossary that includes a word, a definition of the word, and an image associated with the word.

Referring to FIG. 3, in some embodiments, the mobile application further comprises a glossary. In further embodiments, the glossary includes one or more entries, which include a word, a definition of the word, and an example of the word's usage. In some embodiments, the entries also include audio of the word and/or definition read to convey the correct pronunciation of the word. In some embodiments, the entries further include an image, video, or animation associated with the word designed to convey meaning and context to the word and/or its definition. In further embodiments, the glossary is contextual and displays only words used in the current learning activity or the current portion of the current learning activity. In still further embodiments, the audio of the word read has the correct inflection for the context.

In some embodiments, the mobile application requires connection to a computer network to function. In other embodiments, the mobile application is adapted to optionally function as a standalone application, which does not necessarily require connection to a computer network to function.

Set or Sequence of Mobile Applications

In some embodiments, one or more mobile applications are adapted to function as a unit within a predetermined or dynamically determined set or sequence of mobile applications. In some embodiments, each mobile application in a set creates a mobile interactive educational resource that includes learning activities teaching toward an educational objective that is common to the set. In some embodiments, each mobile application in a set creates a mobile interactive educational resource that includes learning activities teaching toward an element of a published educational standard that is common to the set. In some embodiments, each mobile application in a sequence creates a mobile interactive educational resource that includes learning activities teaching toward an educational objective, which is common to the sequence, in a particular order such that understanding is built progressively with one or more activities adding to the educational content of one or more previous activities. In some embodiments, each mobile application in a sequence creates a mobile interactive educational resource that includes learning activities teaching toward an element of the published educational standard, which is common to the sequence, in a particular order.

In further embodiments, a set or sequence of mobile applications is predetermined and authored by an instructional designer or a mentor to the child. In other embodiments, a set or sequence of mobile applications is dynamically determined and assembled by one or more mobile applications detecting other applications on said mobile digital processing device based on one or more criteria. In still further embodiments, one or more criteria are based on similarity of content, similarity of theme, similarity of subject, similarity of learning objectives, or similarity elements of a published educational standard that the learning activities address. In some embodiments, a mobile application detects other applications by communicating with other applications, the operating system of a mobile device, or a database of information external to the mobile device.

In some embodiments, a set or sequence of mobile applications functions as a lesson, which is one or more learning activities that teach toward a specific educational objective or a specific element of a published educational standard. In some embodiments, a set or sequence of mobile applications functions as a learning unit, which is one or more lessons that teach toward a general educational objective or a general element of a published educational standard. In some embodiments, a set or sequence of mobile applications functions as a level of study, which is one or more learning units that teach toward a plurality of general educational objectives or an overarching element of a published educational standard.

In some embodiments, one or more mobile applications within a set or sequence of mobile applications execute other mobile applications within the set or sequence. In some embodiments, one or more mobile applications within a set or sequence of mobile applications recommend other mobile applications within the set or sequence to the child or a mentor to the child. In some embodiments, one or more mobile applications within a set or sequence of mobile applications adapts in content or functionality based on membership in a set or sequence, position in a sequence, or characteristics of other members of the set or sequence. In further embodiments, a mobile application adapts by expanding the scope of its content. In other embodiments, a mobile application adapts by contracting the scope of its content.

Web-Based Educational Suite

The vertically integrated, mobile educational system disclosed herein includes at least one mobile application that creates a mobile interactive educational resource that provides a mobile extension of a web-based educational suite and integrates with the web-based educational suite according to an instructional plan designed to accomplish one or more specific educational objectives in a subject. In view of the disclosure provided herein, the web-based educational suite is created by techniques known to those of skill in the art using hardware, firmware, and software known to the art.

Those of skill in the art will recognize that web based educational suites address a varying number of subjects and comprise a varying number of learning activities. In some embodiments, the web-based educational suite of the instant invention comprises one subject appropriate for the child. In other embodiments, the web-based educational suite comprises more than one subject appropriate for the child. In further embodiments, the web-based educational suite comprises at least three subjects appropriate for the child. In further embodiments, the web-based educational suite offers a plurality of learning activities associated with each subject. In still further embodiments, the web-based educational suite offers at least three learning activities associated with each subject.

In some embodiments, the mobile interactive educational resource provides a mobile extension of a web-based educational suite. In further embodiments, the mobile educational resource extends a web-based educational suite by presenting learning content of the suite adapted for a mobile format suitable for execution and display on a mobile computing device. In further embodiments, the mobile educational resource extends a web-based educational suite by establishing data communications with the infrastructure of the web-based suite. In some embodiments, data communication involves, by way of non-limiting examples, mobile application download data, mobile application installation data, learning activity completion data, performance data, and data on time spent engaged in learning activities. In some embodiments, the mobile educational resource extends a web-based educational suite by presenting educational concepts of the suite in a mobile format. In some embodiments, the mobile educational resource extends a web-based educational suite by presenting characters, music, art, or other features of the suite adapted to a mobile format. In other embodiments, the mobile educational resource extends a web-based educational suite by presenting the theme of the web-based educational suite in a mobile format.

In some embodiments, the mobile interactive educational resource integrates with a web-based educational suite according to an instructional plan designed to accomplish one or more specific educational objectives in a subject. In further embodiments, the instructional plan is authored by an instructional designer. In some embodiments, the instructional plan is designed to accomplish one or more specific educational objectives in one subject. In other embodiments, the instructional plan is designed to accomplish one or more specific educational objectives in more than one subject. In some embodiments, the mobile educational resource integrates with a web-based educational suite by offering one or more learning activities that mutually reinforce individual activities of the suite. In some embodiments, the mobile educational resource integrates with a web-based educational suite by offering one or more learning activities that mutually reinforce accomplishment of educational objectives of the suite. In some embodiments, the mobile educational resource integrates with a web-based educational suite by offering one or more learning activities that mutually reinforce elements of a published educational standard addressed by the suite.

Subjects

The vertically integrated, mobile educational system disclosed herein includes at least one mobile interactive educational resource comprising one or more learning activities associated with a subject appropriate for the child. A subject is a category of learning that a student has the option to undertake; the subjects offered by educational institutions typically include language arts, mathematics, social studies, science, music and other performing arts, visual arts, additional languages, health, fitness and sports, and information technology. In some embodiments, subjects comprise topics addressing one category of learning. In other embodiments, subjects comprise interdisciplinary topics addressing more than one category of learning.

In some embodiments, the subjects include one or more basic subjects appropriate for children aged about 1 to 12 including, by way of non-limiting examples, reading and mathematics. In further embodiments, the subjects include one or more basic topics including, by way of non-limiting examples, letters, phonics, word families, sight words, numbers, and shapes.

In some embodiments, the subjects include one or more preschool subjects appropriate for children aged about 1 to 12 including, by way of non-limiting examples, language arts, mathematics, social studies, science, music, art, and additional languages. In further embodiments, the subjects include one or more preschool topics including, by way of non-limiting examples, citizenship, colors, computer skills, drawing, ethics, geography, music, physical education, poetry, reading, sign language, Spanish, spelling, and U.S. history.

In some embodiments, the subjects include one or more grade school subjects appropriate for children aged about 1 to 12 including, by way of non-limiting examples, language arts, mathematics, social studies, science, music and other performing arts, visual arts, additional languages, health, fitness and sports, and information technology. In further embodiments, the subjects include one or more grade school topics including, by way of non-limiting examples, biology, chemistry, citizenship, composition, computer skills, drawing, earth science, ethics, geography, grammar, physical education, poetry, pre-algebra, reading, sign language, spelling, U.S. government, U.S. history, and writing.

In some embodiments, the subjects include one or more middle school subjects appropriate for children aged about 1 to 12 including, by way of non-limiting examples, language arts, mathematics, social studies, science, music and other performing arts, visual arts, additional languages, health, fitness and sports, and information technology. In further embodiments, the subjects include one or more middle school topics including, by way of non-limiting examples, algebra, American literature, biology, chemistry, composition, computer skills, drawing, earth science, ethics, geography, geometry, grammar, journalism, photography, physical education, poetry, pre-algebra, reading, spelling, U.S. government, U.S. history, world history, and writing.

In some embodiments, the subjects include one or more language arts topics appropriate for children aged about 1 to 12 including, by way of non-limiting examples, phonics, letters, letter sounds, letter pairs, sight words, reading, vocabulary, spelling, grammar, writing, composition, public speaking, literature, and poetry.

In some embodiments, the subjects include one or more mathematics topics appropriate for children aged about 1 to 12 including, by way of non-limiting examples, arithmetic, geometry, probability, statistics, logic, and algebra.

In some embodiments, the subjects include one or more social studies topics appropriate for children aged about 1 to 12 including, by way of non-limiting examples, community institutions, local, state, U.S., and world history, local, state, U.S., and world geography, U.S. Constitution, U.S. government, and U.S. Presidents.

In some embodiments, the subjects include one or more science topics appropriate for children aged about 1 to 12 including, by way of non-limiting examples, biology, ecology, meteorology, oceanography, marine biology, botany, anatomy, zoology, chemistry, earth science, and astronomy.

In some embodiments, the subjects include one or more arts topics appropriate for children aged about 1 to 12 including, by way of non-limiting examples, writing, composition, poetry, art, music, drawing, painting, and dance.

In some embodiments, the subjects include one or more heath, sports, and fitness topics appropriate for children aged about 1 to 12 including, by way of non-limiting examples, health, nutrition, and physical education.

In some embodiments, the subjects include one or more information technology topics appropriate for children aged about 1 to 12 including, by way of non-limiting examples, computer skills and Internet safety.

Learning Activities

The vertically integrated, mobile educational system disclosed herein includes at least one mobile interactive educational resource comprising one or more learning activities associated with a subject appropriate for the child. In some embodiments, one or more learning activities are selected from preschool activities including, by way of non-limiting examples, books, games, puzzles, art, and music. In some embodiments, one or more learning activities are selected from K-12 activities including, by way of non-limiting examples, books, games, puzzles, art, music, reading assignments, articles, videos, demonstrations, simulations, quizzes, examinations, worksheets, problem sets, brainstorms, journals, multi-player games, group activities, and collaborations.

In some embodiments, one or more learning activities are interactive virtual books. In some embodiments, interactive virtual books include text and/or images. In some embodiments, the images comprise animation or video. In further embodiments, interactive virtual books include animated pages. In still further embodiments, interactive virtual books optionally include voice audio of the text or story read. In still further embodiments, interactive virtual books optionally include music.

Referring to FIG. 1, in one embodiment, an interactive virtual book includes access to context-specific suggestions of things to do or talk about 1, a glossary 2, a full screen mode 3, and audio of each word read accessed by interacting with each word 4.

Figure 4:
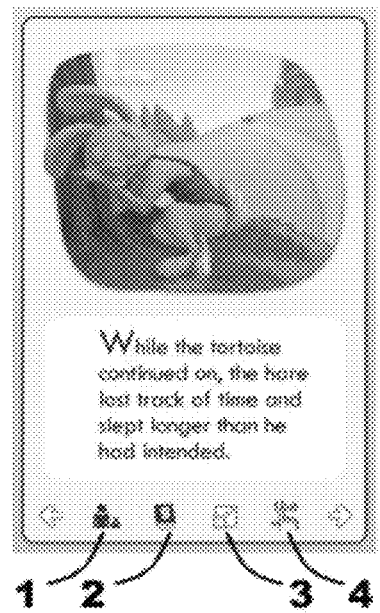
FIG. 4 shows a non-limiting example of an interactive virtual book; in this case, a book including text, images, manually operated animated pages, and access to context-specific suggestions of things to do or talk about 1, a glossary 2, a full screen mode 3, and audio of each word read accessed by interacting with each word 4.

Referring to FIG. 4, in one embodiment, an interactive virtual book includes text, images, and manually operated animated pages.

In some embodiments, interactive virtual books further comprise one or more software modules that extend the features and functionality of the books. In some embodiments, interactive virtual books further comprise a software module for providing a full screen mode. In some embodiments, interactive virtual books further comprise a software module for providing highlighting of the text corresponding to audio of the text read. In further embodiments, the software module allows the child or a mentor to customize the color of the highlight. In some embodiments, interactive virtual books further comprise a software module for recording voice audio of a child or a mentor reading. In further embodiments, the software module allows sharing books personalized by recorded voice audio with others. In some embodiments, interactive virtual books further comprise one or more quizzes, puzzles, games, songs, and/or art activities.

In some embodiments, the interactive virtual books further comprise a software module for providing audio of each word read, wherein said audio is accessed by interacting with each word. In further embodiments, the audio of the word read has the correct inflection for the current context.

In some embodiments, a child or a mentor interacts with a word by selecting elements of application's GUI associated with the word including, by way of non-limiting examples, text, icons, buttons, and form elements. In some embodiments, a child or a mentor selects words using a pointing device including, by way of non-limiting examples, a mouse, trackball, trackpad, joystick, pen, or stylus. In further embodiments, a child or a mentor selects words with a pointing device by actions including, by way of non-limiting examples, clicking, double clicking, right clicking, shift clicking, control clicking, command clicking, dragging, or drawing. In some embodiments, a child or a mentor selects words using a touchscreen or multi-touchscreen. In further embodiments, a child or a mentor selects words with a touch screen or multi-touch screen by gestures including, by way of non-limiting examples, swiping, tapping, double tapping, dragging, pinching, reverse pinching, or drawing. In other embodiments, a child or a mentor selects words using a microphone to capture voice or other sound input. In other embodiments, a child or mentor selects words using a video camera to capture motion or visual input. In some embodiments, a child or mentor selects words using a keyboard, keypad, or alternative text input device, by typing the word.

Figure 5:
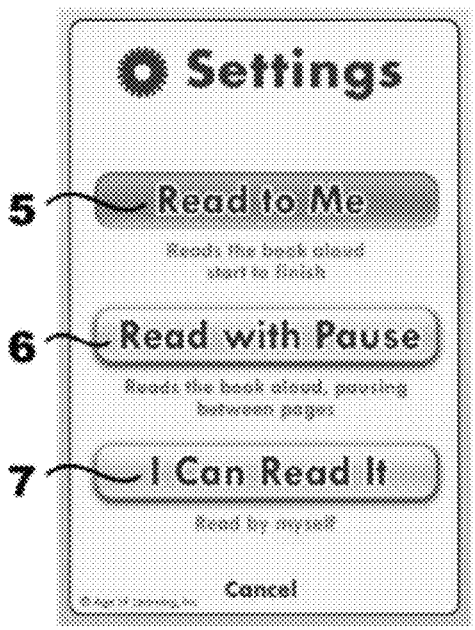
FIG. 5 shows a non-limiting example of an interactive virtual book including a plurality of use modes; in this case, a book with access to a "Read to Me" mode 5 wherein the book is read to the child from start to finish, a "Read with Pause" mode 6 wherein the book is read to the child with pauses between pages, and an "I Can Read It" mode 7 wherein the child reads the book themselves.

Referring to FIG. 5, in some embodiments, interactive virtual books include access to a plurality of use modes. In one embodiment, an interactive virtual book includes access to a "Read to Me" mode 5 wherein the book is read to the child from start to finish, a "Read with Pause" mode 6 wherein the book is read to the child with pauses between pages, and an "I Can Read It" mode 7 wherein the child reads the book themselves.

In some embodiments, one or more use modes include text of the story. In some embodiments, one or more use modes include images associated with the text or with the story. In some embodiments, one or more use modes include audio of the text or story read. In some embodiments, one or more use modes include music. In some embodiments, one or more use modes include automatic animation of pages turning. In some embodiments, one or more use modes include automatic animation of pages turning that pauses between pages. In other embodiments, one or more use modes include automatic animation of pages turning that does not pause between pages. In other embodiments, one or more use modes include manually operated animation of pages turning. In view of the disclosure provided herein, those of skill in the art will recognize that use modes comprise any combination of the use mode features disclosed herein. In some embodiments, the child or a mentor optionally switches between reading modes.

In some embodiments, a child or a mentor turns pages by selecting elements associated with the application's GUI including, by way of non-limiting examples, text, arrows, other icons, buttons, pages, or the corner or edge of a page. In some embodiments, a child or a mentor turns pages using a pointing device including, by way of non-limiting examples, a mouse, trackball, trackpad, joystick, pen, or stylus. In further embodiments, a child or a mentor turns pages with a pointing device by actions including, by way of non-limiting examples, clicking, double clicking, right clicking, shift clicking, control clicking, command clicking, dragging, or drawing. In some embodiments, a child or a mentor turns pages using a touchscreen or multi-touchscreen. In further embodiments, a child or a mentor turns pages with a touch screen or multi-touch screen by gestures including, by way of non-limiting examples, swiping, tapping, double tapping, dragging, pinching, reverse pinching, or drawing. In other embodiments, a child or a mentor turns pages using a microphone to capture voice or other sound input. In other embodiments, a child or mentor turns pages using a video camera to capture motion or visual input. In some embodiments, a child or mentor turns pages using a keyboard, keypad, or alternative text input device, by typing the number of a page. In some embodiments, a child or a mentor turns pages by shaking the mobile device.

Figure 6:
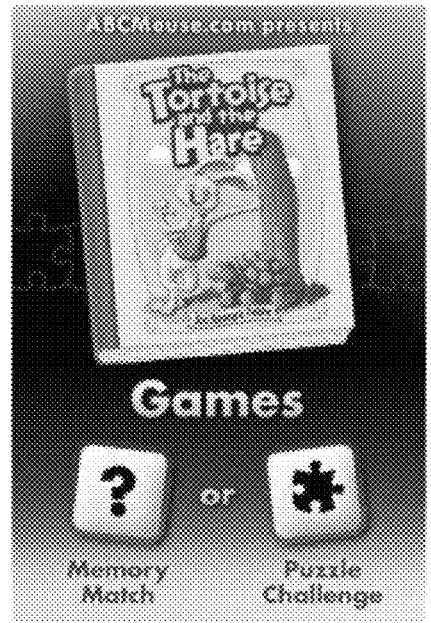
FIG. 6 shows a non-limiting example of an interactive virtual book including a game and a puzzle; in this case, a book further including a memory match game and a jigsaw puzzle.

Referring to FIG. 6, in some embodiments, virtual books further include one or more additional learning activities, such as games or puzzles.

Figure 7:
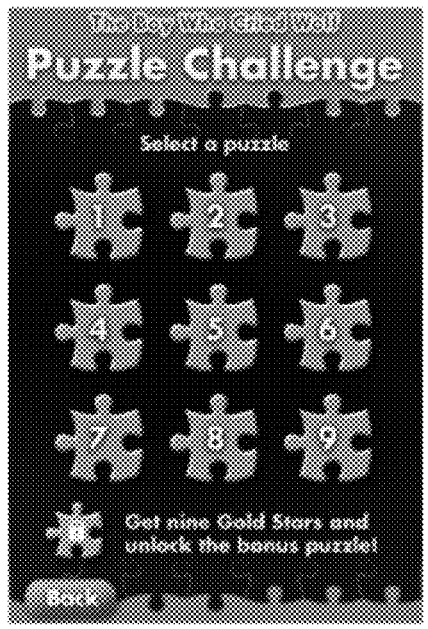
FIG. 7 shows a non-limiting example of a mobile application including executable instructions that create a mobile interactive educational resource comprising a learning activity; in this case, a jigsaw puzzle.

Referring to FIG. 7, in some embodiments, one or more learning activities are puzzles. In some embodiments, one or more puzzles are cutout puzzles. In some embodiments, a cutout puzzle invites the child to fit shaped puzzle pieces into cutouts in a puzzle board to reinforce an educational message. In some embodiments, one or more puzzles are jigsaw puzzles. In some embodiments, a jigsaw puzzle invites the child to fit shaped puzzle pieces together to complete an image that reinforces an educational message. In some embodiments, the puzzle includes audio elements to, by way of non-limiting examples, encourage the child, instruct the child, reward the child, identify the educational objectives of the puzzle, demonstrate an educational message in the puzzle, and identify the title of the puzzle.

Figure 8:
FIG. 8 shows a non-limiting example of a mobile application including executable instructions that create a mobile interactive educational resource comprising a learning activity; in this case, a memory match game.

Referring to FIG. 8, in some embodiments, one or more learning activities are games. In further embodiments, one or more games are in a memory matching game format. In some embodiments, a memory matching game invites the child to interact with the game to flip pairs of cards to match words with images to reinforce an educational message.

Figure 9:
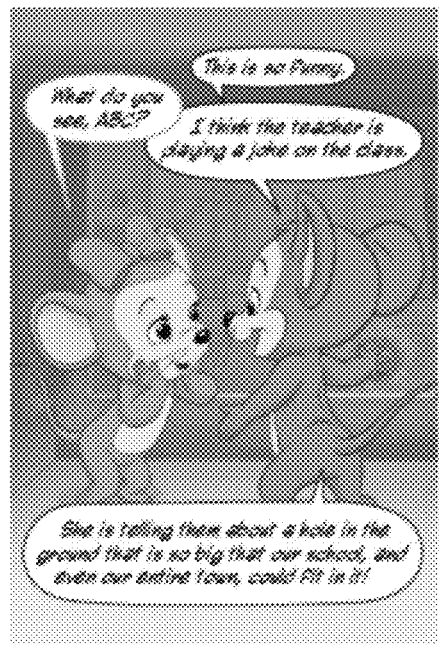
FIG. 9 shows a non-limiting example of an interactive virtual book; in this case, a book wherein the text is presented in animated pop-up bubbles, the images are arranged substantially in a graphic novel format, and the voice audio is that of one or more character voices.

Referring to FIG. 9, in some embodiments, virtual books are substantially in a graphic novel format. In further embodiments, the text is presented in animated pop-up bubbles, the images are arranged substantially in a graphic novel format; and voice audio, if any, is that of one or more character voices.

Figure 10:
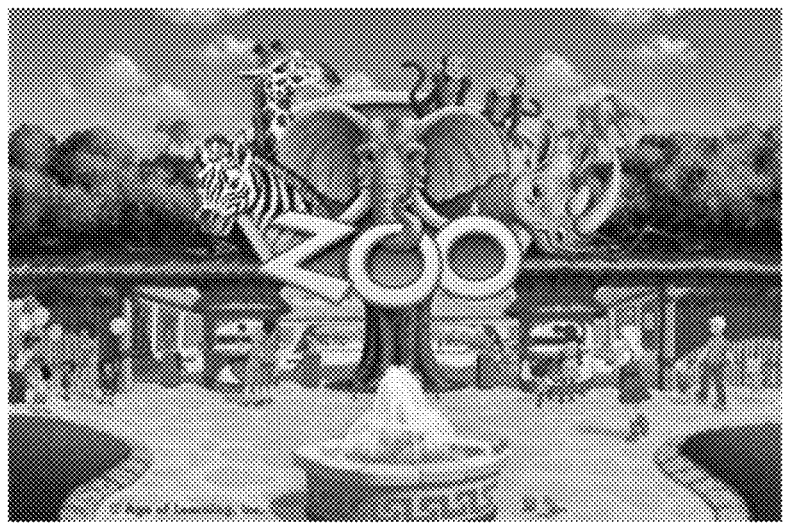
FIG. 10 shows a non-limiting example of a mobile application including executable instructions that create a mobile interactive educational resource comprising a learning activity; in this case, an interactive exploration of a zoo.
Figure 11:
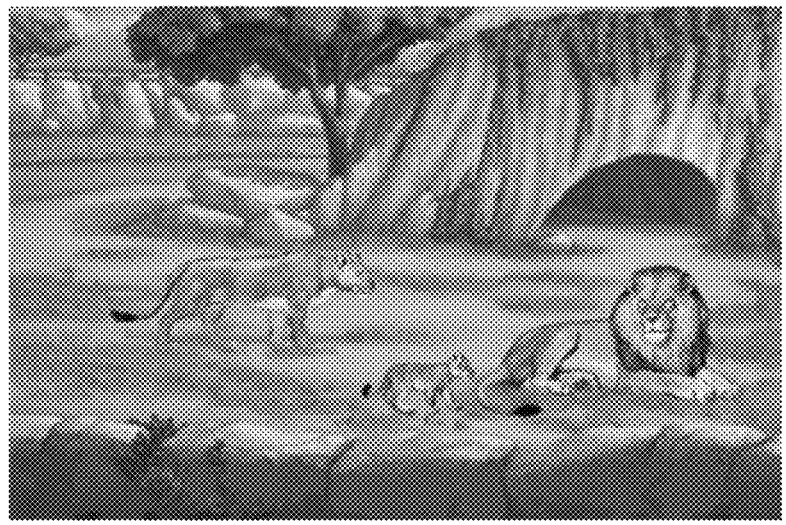
FIG. 11 shows a non-limiting example of an interactive exploration including animated visual content depicting an environment suitable for the child's learning; in this case, an interactive exploration including animated visual content depicting a lion exhibit at a zoo.

Referring to FIGS. 10 and 11, in some embodiments, one or more learning activities are interactive explorations. In further embodiments, interactive explorations include animated visual content depicting an environment suitable for the child's learning. In one embodiment, the visual content depicts a zoo. In other embodiments, the animated visual content depicts environments such as bedrooms, backyards, cities, towns, playgrounds, school busses, zoos, farms, parks, beaches, mountains, deserts, oceans, lakes, jungles, tunnels, caves, undersea environments, arctic and Antarctic environments, extraterrestrial environments, gardens, campuses, scientific laboratories, art studios, music conservatories, computer laboratories, observatories, planetariums, movies, plays, puppet shows, sporting events, amusement parks, carnivals, theme parks, arcades, pet stores, shopping malls, markets, kitchens, garages, machine shops, wood working shops, metal working shops, and medical facilities. In further embodiments, the animated visual content is video. In further embodiments, the animated visual content is reinforced by appropriate sound effects.

Figure 12:
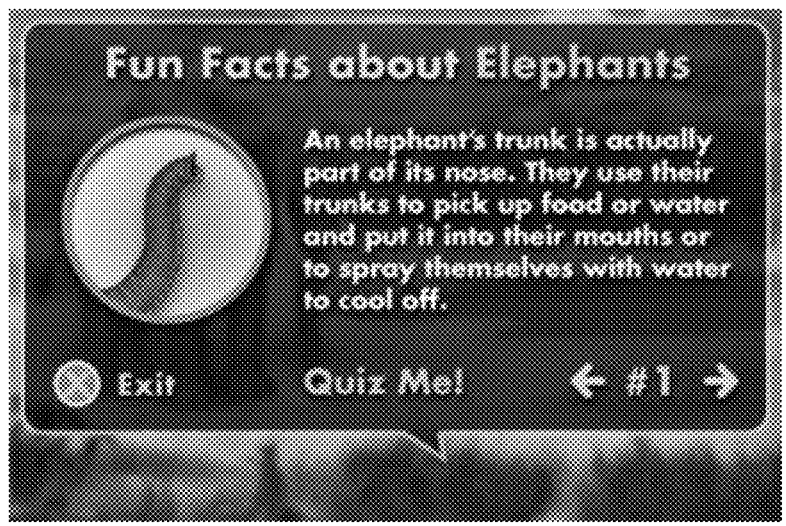
FIG. 12 shows a non-limiting example of an interactive exploration including factual information presented in pop-up bubbles; in this case, factual information about elephants.

Referring to FIG. 12, in further embodiments, interactive explorations include factual information presented in pop-up bubbles. In still further embodiments, the factual information presented in pop-up bubbles is activated by interacting with the mobile application using methods described herein.

Figure 13:
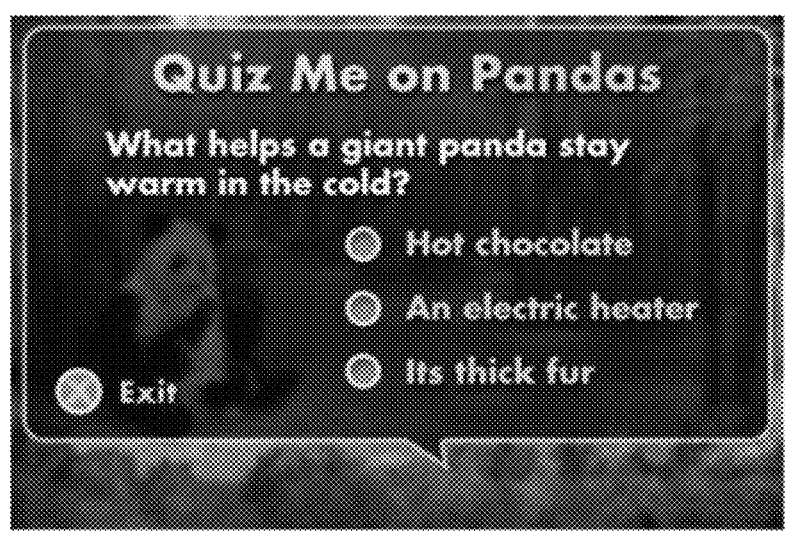
FIG. 13 shows a non-limiting example of an interactive exploration including a quiz; in this case, a quiz on facts about pandas.

Referring to FIG. 13, in further embodiments, interactive explorations include one or more interactive quizzes. In still further embodiments, an interactive quiz communicates data to a software module for providing comparison of performance with other users of the system. In some embodiments, an interactive quiz communicates data to a web-based educational suite.

In some embodiments, one or more learning activities are songs. In some embodiments, songs are downloadable audio files. In other embodiments, songs include text of the lyrics and audio of the lyrics sung. In further embodiments, songs include an optional bouncing ball animation over text of the lyrics corresponding to audio of the lyrics sung. In some embodiments, the child experiences songs through an interactive virtual audio player. In further embodiments, the audio player displays the name of the song. In further embodiments, the audio player offers controls including, by way of non-limiting examples, a progress indicator, a volume control, and play/pause controls. In still further embodiments, the audio player includes images, video, and/or animation corresponding to the lyrics. In some embodiments, songs include a feature to reduce or remove the voice track and a feature to record singing of the lyrics using the digital processing device of the system. In further embodiments, songs include a feature for children and their mentors to share songs with personalized signing with other users of the mobile educational system.

In some embodiments, one or more learning activities are art activities. In some embodiments, one or more art activities are coloring pages. In some embodiments, a coloring page invites the child to select tools and colors to fill in an image in order to reinforce an educational message. In some embodiments, one or more art activities are dot-to-dots. In some embodiments, a dot-to-dot invites the child to connect dots to complete an image based on a sequence of letters or numbers. In some embodiments, a dot-to-dot subsequently invites the child to select tools and colors to fill in the image in order to reinforce an educational message. In some embodiments, one or more art activities are paint-by-numbers. In some embodiments, paint-by-number invites the child to match numbers to a numbered color palette to fill in an image in order to reinforce an educational message. In some embodiments, one or more art activities are printable activities. In some embodiments, a printable invites the child to print a worksheet and subsequently, color, draw, write, or trace on it in order to reinforce an educational message. In some embodiments, one or more printable activities include, by way of non-limiting examples, coloring, drawing, writing, tracing, connect-the-dots, paint-by-number, paint-by-letter, or paint-by-word.

In some embodiments, one or more learning activities are e-books. An e-book is a text and/or image-based publication in digital form produced on, published by, and readable on computers or other digital devices. In view of the disclosure provided herein, the e-books are created by techniques known to those of skill in the art using machines, software, and languages known to the art. Those of skill in the art will recognize that several e-book formats are suitable for use in the system including, by way of non-limiting examples, plain text, hypertext markup language, Amazon® Kindle™, Open Electronic Package, TomeRaider, Arghos Diffusion, Flip Books, ANSI/NISO 239.86 (DAISY), FictionBook, Text Encoding Initiative, Plucker, Compressed HM, Portable Document Format, PostScript, DjVu, Microsoft LIT, eReader, Desktop Author, Newton eBook, Founder Electronics, Libris, Mobipocket, EPUB, Broadband eBooks (BBeB), SSReader, TealDoc, IEC 62448, and Comic Book Archive file.

In some embodiments, the plurality of activities includes one or more activities with content unique to the educational system and not available elsewhere. In further embodiments, the unique content includes, by way of non-limiting examples, images, video, animation, game formats, text, words of stories, lyrics of songs, spoken word audio, sound effects, and music.

In some embodiments, the child's completion of a learning activity in the vertically integrated, mobile educational system disclosed herein is the equivalent of completing the same activity in a web-based educational suite. In further embodiments, completion of an activity within the mobile educational system will allow the learner to later proceed past that same activity if encountered in a predetermined sequence of activities offered by a web-based educational suite. In some further embodiments, completion of an activity within the mobile educational system will cause the activity to be marked as completed in progress displays and printable reports associated with a web-based educational suite.

In some embodiments, the learning activities are available in English. In other embodiments, one or more learning activities are available in a language other than English. In further embodiments, text, audio, and language containing images, animation, and video are available in a language other than English. In some embodiments, languages other than English include, by way of non-limiting examples, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In still further embodiments, the content of text, audio, images, animations, and video is designed to be sensitive to the norms of the culture or cultures in which the language is prevalent.

Software Modules

The vertically integrated, mobile educational system disclosed herein includes mobile applications and learning activities that comprise one or more software modules. In view of the disclosure provided herein, the software modules are created by techniques known to those of skill in the art using machines, software, and languages known to the art. In some embodiments, the software modules are in one computer program or application. In other embodiments, the software modules are in more than one computer program or application. In some embodiments, the software modules are hosted on one machine. In other embodiments, the software modules are hosted on more than one machine. In some embodiments, the software modules are hosted on one or more machines in one location. In other embodiments, the software modules are hosted on one or more machines in more than one location.

EXAMPLES

The following illustrative examples are representative of embodiments of the vertically integrated, mobile educational system described herein and are not meant to be limiting in any way.

Example 1

Mobile Application Teaching Toward Educational Objectives in Science

A mentor to a child downloads and installs a mobile application onto an Apple® iPad® via the World Wide Web. The mobile application creates a mobile interactive educational resource that provides a mobile extension to a web-based educational suite. The suite is a web-based collection of over two hundred learning activities that each address one of four subjects including: language arts, mathematics, science, and music. The mobile interactive educational resource extends the web-based educational suite by providing learning activities that share educational objectives with the suite. The learning activities also extend characters and themes of the suite's learning activities to a mobile environment. The mobile interactive educational resource integrates with the web-based educational suite according to an instructional plan by providing two science learning activities. The mobile interactive educational resource is free of activities not teaching toward a specific educational objective in science. The first learning activity is an interactive virtual book about the sun. The interactive educational resource also includes a quiz. The interactive virtual book includes text, images, voice audio of the text read, and animated pages. The book offers two use modes. First, a mode with voice audio of the text read and automatically turning pages. Second, a mode with voice audio of the text read and pages that the child turns pages manually by swiping a finger across the multi-touchscreen of the device.

The system is used by an elementary school teacher who provides the iPad including the mobile application to a 6-year-old for use in the classroom. The child uses ear buds to experience the learning activities without disturbing other students. The teacher provides access to the iPad as a reward for good behavior and attentiveness in class. The child spends eleven minutes interacting with the interactive virtual book and spends five minutes taking the accompanying quiz. After the child shows the teacher her perfect score on the quiz, the teacher awards her another, future, interaction with the device.

Example 2

Mobile Application Identifying a Set of Applications

A mentor to a child downloads and installs a mobile application onto a smartphone capable of playing Adobe® Flash® files via the World Wide Web. The mobile application creates a mobile interactive educational resource that provides a mobile extension to a web-based educational suite. The suite is a web-based collection of over two hundred learning activities that each address one of three subjects including: language arts, science, and visual arts. The mobile interactive educational resource extends the web-based educational suite by providing learning activities that share educational objectives with the suite. The learning activities also extend characters and themes of the suite's learning activities to a mobile environment.

The mobile interactive educational resource integrates with the web-based educational suite according to an instructional plan that is directed towards the learning objective of improving the child's ability to read and understand sight words when they are used within stories. This mobile application, which is an interactive virtual book, contextualizes this learning objective in stories related to animals found in and around the ocean.

Once installed, the mobile application accesses a local database of all mobile applications that are extensions of the same web-based educational suite, and identifies other applications that are directed towards the same learning objective or have content that is related to the same theme (ocean animals). It then modifies all of those applications so that each such application on the device refers the user to all the other identified applications as recommendations of related learning activities to do.

The child and mentor interact with this interactive educational book by having it read aloud, by touching individual sight words in the story to hear them, and by recording some of the words of the story and hearing them played back as those words appear on the screen of the device. When that interaction is complete, the application recommends that the child play a sight word game that is an element of a previously downloaded application, and loads that game if the child chooses to do so. The application also recommends that the child do paint-by-number art activities that feature some of the animals that were mentioned in the story, such activities being elements of a different previously downloaded application.

Both child and mentor can, at any time, see a listing of all installed mobile applications that are extensions of the same web-based educational suite which are directed towards a given learning objective or share common content themes. The mentor uses this capability to encourage the child to do activities of many different types—games, puzzles, art activities, and songs—that are all directed towards the same learning objective. Because of the mutual reinforcement of these activities and the fact that they address several different styles of learning, the child is highly engaged and achieves the intended learning objective rapidly.

What is claimed is:

1. A vertically integrated, mobile educational system for a child aged about 1 to about 12 years comprising:
 a. a mobile digital processing device that is optionally connected to a computer network, wherein said processing device comprises a processor and an operating system configured to execute mobile applications; and
 b. at least one mobile application, provided to said mobile digital processing device, including executable instructions that create a mobile interactive educational resource, said resource characterized by:
  i. providing a mobile extension of a web-based educational suite by presenting one or more educational concepts of the suite in a native mobile format, wherein the at least one mobile application optionally functions with a connection to a computer network or without a connection to a computer network;
  ii. integrating with said web-based educational suite by reinforcing one or more common educational objectives in a subject according to an instructional plan, the instructional plan pre-designed to accomplish at least the one or more educational objectives in the subject; and
  iii. comprising one or more learning activities associated with the subject, wherein said educational resource is substantially free of activities not teaching toward one or more educational objectives in a subject, wherein completion of a learning activity in the at least one mobile application is the equivalent of completing a substantially similar activity in the web-based educational suite and causes the activity to be marked as completed in progress displays and printable reports associated with the web-based educational suite;
 provided that the instructional plan, the subject, the one or more learning activities, and the one or more educational objectives are suitable for the child aged about 1 to about 12 years with regard to subject matter and difficulty.

2. The mobile educational system of claim 1, wherein the system is for a child aged about 2 years to about 10 years.

3. The mobile educational system of claim 1, wherein the system is for a child aged about 2 years to about 6 years.

4. The mobile educational system of claim 1, wherein the web-based educational suite comprises at least three subjects appropriate for the child and a plurality of learning activities associated with each subject.

5. The mobile educational system of claim 1, wherein said instructional plan is authored by an instructional designer.

6. The mobile educational system of claim 1, wherein said mobile application is adapted to function as a unit within a predetermined or dynamically determined set or sequence of mobile applications.

7. The mobile educational system of claim 6, wherein said set or sequence of mobile applications is predetermined and authored by an instructional designer or a mentor to the child.

8. The mobile educational system of claim 6, wherein said set or sequence of mobile applications is dynamically determined and assembled by one or more mobile applications detecting other applications on said mobile digital processing device based on one or more criteria.

9. The mobile educational system of claim 8, wherein said criteria is selected from: similarity of content, similarity of theme, similarity of one or more learning objectives, or similarity of one or more elements of a published educational standard addressed.

10. The mobile educational system of claim 6, wherein one or more mobile applications within a set or sequence of mobile applications executes or recommends other mobile applications within said set or sequence.

11. The mobile educational system of claim 6, wherein one or more mobile applications within a set or sequence of mobile applications adapts in content or functionality based on one or more of: membership in a set or sequence, position in a sequence, or characteristics of other members of the set or sequence.

12. The mobile educational system of claim 1, wherein said mobile application further comprises a software module for providing context-specific suggestions of things to do or talk about with the child that support one or more educational objectives, wherein the software module is adapted for use by a mentor.

13. The mobile educational system of claim 1, wherein completion of a learning activity in said mobile application is the equivalent of completing a substantially similar activity with regard to progressing to subsequent activities in a predetermined sequence.

14. The mobile educational system of claim 1, wherein said mobile application further comprises a software module for providing comparison of performance with other users of the system.

15. The mobile educational system of claim 1, wherein said mobile application further comprises a software module for providing the child the ability to customize said mobile application.

16. The mobile educational system of claim 1, wherein said mobile application further comprises a glossary.

17. The mobile educational system of claim 16, wherein said glossary comprises one or more entries, wherein said entries comprise a word, a definition of the word, and an example of the word's usage; optionally, said entries further comprise audio of the word and definition read; optionally, said entries further comprise an image, video, or animation associated with the word.

18. The mobile educational system of claim 17, wherein said glossary is contextual and displays only words used in the current learning activity.

19. The mobile educational system of claim 18, wherein said glossary displays only words used in the current portion of the current learning activity.

20. The mobile educational system of claim 19, wherein said audio of the word read has the correct inflection for the context.

21. The mobile educational system of claim 1, wherein said mobile application comprises one or more learning activities selected from art, articles, books, brainstorms, collaborations, demonstrations, examinations, games, group activities, journals, laboratory experiments, lectures, multi-player games, music, problem sets, puzzles, quizzes, reading assignments, role-plays, simulations, songs, videos, and worksheets.

22. The mobile educational system of claim 1, wherein said mobile application comprises one or more learning activities that are interactive virtual books, wherein said books comprise:
  i. text and/or images;
  ii. animated pages;
  iii. optionally, voice audio; and
  iv. optionally, music.

23. The mobile educational system of claim 22, wherein said interactive virtual books further comprise a plurality of use modes, wherein one or more use modes are selected from:
  i. a paced reading mode comprising text, images associated with said text, audio of said text read, music, and automatic animation of pages turning;
  ii. a paced reading mode comprising text, images associated with said text, audio of said text read, and automatic animation of pages turning;
  iii. a partially paced reading mode comprising text, images associated with said text, audio of said text read, and manually operated animation of pages turning;
  iv. an independent reading mode comprising text, images associated with said text, and manually operated animation of pages turning;
  v. an independent reading mode comprising text and manually operated animation of pages turning;
  vi. a paced picture book mode comprising images, audio of the story read, music, and automatic animation of pages turning;
  vii. a paced picture book mode comprising images, audio of the story read, and automatic animation of pages turning;
  viii. a partially paced picture book mode comprising images, audio of the story read, and manually operated animation of pages turning; and
  ix. an independent picture book mode comprising images and manually operated animation of pages turning.

24. The interactive virtual book of claim 22, wherein, optionally, the child or a mentor switches between said reading modes.

25. The interactive virtual book of claim 22, further comprising a full screen mode.

26. The interactive virtual book of claim 22, further comprising a software module available in a paced or partially paced reading mode for providing highlighting of said text corresponding to said audio of the text read.

27. The interactive virtual book of claim 22, further comprising a software module for providing audio of each word read, wherein said audio is accessed by interacting with each word.

28. The interactive virtual book of claim 27, wherein said audio of the word read has the correct inflection for the context.

29. The interactive virtual book of claim 22, further comprising a software module for recording voice audio of a child or a mentor reading.

30. The interactive virtual book of claim 29, further comprising a software module for sharing books personalized by recorded voice audio with others.

31. The interactive virtual book of claim 22, wherein said images comprise animation or video.

32. The interactive virtual book of claim 22, further comprising a quiz.

33. The interactive virtual book of claim 22, further comprising a puzzle.

34. The interactive virtual book of claim 22, further comprising a game.

35. The interactive virtual book of claim 22, further comprising a song.

36. The interactive virtual book of claim 22, further comprising an art activity.

37. The interactive virtual book of claim 22, wherein the subject matter is designed to teach one or more of: names of the letters of the alphabet, phonics, phonemic awareness, sight words, vocabulary development, spelling, structure of language, punctuation, composition, numeration, subitizing, arithmetic operations, measurement, pattern recognition and extension, and elementary algebra concepts.

38. The interactive virtual book of claim 22, wherein:
   i. said text is presented in animated pop-up bubbles;
   ii. said images are arranged substantially in a graphic novel format; and
   iii. said voice audio is that of one or more character voices.

39. The mobile educational system of claim 1, wherein said mobile application comprises one or more learning activities that are interactive explorations, wherein said interactive explorations comprise:
   i. animated visual content depicting an environment suitable for the child's learning;
   ii. sound effects;
   iii. factual information presented in pop-up bubbles; and
   iv. one or more quizzes.

40. The interactive exploration of claim 39, wherein said factual information presented in pop-up bubbles is activated by interacting with said mobile application.

41. The interactive exploration of claim 39, wherein said animated visual content is video.

42. The interactive exploration of claim 39, wherein said animated visual content depicts an environment selected from: bedrooms, backyards, cities, towns, playgrounds, school busses, zoos, farms, parks, beaches, mountains, deserts, oceans, lakes, jungles, tunnels, caves, undersea environments, arctic and Antarctic environments, extraterrestrial environments, gardens, campuses, scientific laboratories, art studios, music conservatories, computer laboratories, observatories, planetariums, movies, plays, puppet shows, sporting events, amusement parks, carnivals, theme parks, arcades, pet stores, shopping malls, markets, kitchens, garages, machine shops, wood working shops, metal working shops, and medical facilities.

43. The interactive exploration of claim 39, wherein said animated visual content depicts a zoo.

44. The interactive exploration of claim 39, wherein said animated visual content depicts a farm.

45. The mobile educational system of claim 1, wherein said mobile application comprises one or more learning activities that are quizzes.

46. The mobile educational system of claim 1, wherein said mobile application comprises one or more learning activities that are puzzles.

47. The mobile educational system of claim 1, wherein said mobile application comprises one or more learning activities that are games.

48. The mobile educational system of claim 1, wherein said mobile application comprises one or more learning activities that are songs.

49. The mobile educational system of claim 1, wherein said mobile application comprises one or more learning activities that are art activities.

50. The mobile educational system of claim 1, wherein said mobile application comprises one or more learning activities that are e-books.

51. The mobile educational system of claim 1, wherein one or more learning activities are available in a language other than English.

52. The mobile educational system of claim 1, wherein one or more learning activities are available in one or more languages selected from: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, Javanese, and Tagalog.

53. Non-transitory computer readable media encoded with a mobile application including instructions executable by the operating system of a mobile digital processing device for creating a mobile interactive educational resource for a child aged about 1 to about 12 years, said resource characterized by:
   i. providing a mobile extension of a web-based educational suite by presenting one or more educational concepts of the suite in a native mobile format, wherein the mobile application optionally functions with a connection to a computer network or without a connection to a computer network;
   ii. integrating with said web-based educational suite by reinforcing one or more common educational objectives in a subject according to an instructional plan, the instructional plan pre-designed to accomplish at least the one or more educational objectives in the subject; and
   iii. comprising one or more learning activities associated with the subject, wherein said educational resource is substantially free of activities not teaching toward one or more educational objectives in a subject, wherein completion of a learning activity in the mobile application is the equivalent of completing a substantially similar activity in the web-based educational suite and causes the activity to be marked as completed in progress displays and printable reports associated with the web-based educational suite;
   provided that the instructional plan, the subject, the one or more learning activities, and the one or more educational objectives are suitable for the child aged about 1 to about 12 years with regard to subject matter and difficulty.

54. A method of facilitating the educational development of a child aged about 1 to about 12 years comprising the step of providing executable instructions, in the form of at least one mobile application, to a mobile digital processing device, the device comprising an operating system configured to perform executable instructions, a memory device, a display, an input device, and a sound output device, to create a mobile interactive educational resource, said resource characterized by:
   (a) providing a mobile extension of a web-based educational suite by presenting one or more educational concepts of the suite in a native mobile format, wherein the at least one mobile application optionally functions with a connection to a computer network or without a connection to a computer network;
   (b) integrating with said web-based educational suite by reinforcing one or more common educational objectives in a subject according to an instructional plan, the instructional plan pre-designed to accomplish at least the one or more educational objectives in the subject; and
   (c) comprising one or more learning activities associated with the subject, wherein said educational resource is substantially free of activities not teaching toward one or more educational objectives in a subject, wherein completion of a learning activity in the at least one mobile application is the equivalent of completing a substantially similar activity in the web-based educational suite and causes the activity to be marked as completed in progress displays and printable reports associated with the web-based educational suite;
   provided that the instructional plan, the subject, the one or more learning activities, and the one or more educational objectives are suitable for the child aged about 1 to about 12 years with regard to subject matter and difficulty.

* * * * *